US012743630B2

(12) United States Patent
Wachtor et al.

(10) Patent No.: US 12,743,630 B2
(45) Date of Patent: Sep. 22, 2026

(54) DEEP LEARNING METHOD FOR DEFECT CHARACTERIZATION

(71) Applicant: Triad National Security, LLC, Los Alamos, NM (US)

(72) Inventors: Adam Joseph Wachtor, Santa Fe, NM (US); Eric Brian Flynn, Santa Fe, NM (US); Erica Marie Jacobson, Los Alamos, NM (US); Ian Thomas Cummings, Los Alamos, NM (US); Joshua David Eckels, Ann Arbor, MI (US); Isabel Faith Fernandez, Atlanta, GA (US); Kelly Ho, Seattle, WA (US)

(73) Assignee: TRIAD NATIONAL SECURITY, LLC, Los Alamos, NM (US)

( * ) Notice: Subject to any disclaimer, the term of this patent is extended or adjusted under 35 U.S.C. 154(b) by 768 days.

(21) Appl. No.: 18/121,760

(22) Filed: Mar. 15, 2023

(65) Prior Publication Data

US 2023/0297843 A1 Sep. 21, 2023

Related U.S. Application Data

(60) Provisional application No. 63/320,124, filed on Mar. 15, 2022.

(51) Int. Cl.

| | |
|---|---|
| ***G06V 10/82*** | (2022.01) |
| ***G06N 3/0464*** | (2023.01) |
| ***G06N 3/096*** | (2023.01) |

(52) U.S. Cl.

CPC .......... *G06N 3/096* (2023.01); *G06N 3/0464* (2023.01)

(58) Field of Classification Search

CPC ........ G06N 3/096; G06N 3/0464; G06N 3/09; G06N 3/0455; G01B 17/02; G01N 29/043; G01N 29/4472; G01N 29/4481

See application file for complete search history.

(56) References Cited

U.S. PATENT DOCUMENTS

| | | | | |
|---|---|---|---|---|
| 2020/0143093 | A1* | 5/2020 | Zhao | G05B 13/042 |
| 2021/0407072 | A1* | 12/2021 | Ben Baruch | G06T 7/0004 |
| 2022/0060492 | A1* | 2/2022 | Giaconi | G06N 3/084 |
| 2022/0084176 | A1* | 3/2022 | Tamura | G06T 3/40 |
| 2022/0366179 | A1* | 11/2022 | Zagaynov | G06N 3/045 |
| 2023/0027216 | A1* | 1/2023 | Hollinger | G06F 18/214 |

(Continued)

OTHER PUBLICATIONS

Nguyen et al. "Ultrasonic wavefield inversion and migration in complex heterogeneous structures: 2D numerical imaging and non-destructive testing experiments" Sep. 2017 Ultrasonics 82 (2018) 357-370, (Year: 2017).*

*Primary Examiner* — Ming Y Hon

(74) *Attorney, Agent, or Firm* — SQUIRE PATTON BOGGS (US) LLP

(57) ABSTRACT

A method and system employing deep learning techniques improves processing speed and spatial resolution of acoustic wavenumber spectroscopy (ASSESS) techniques by performing semantic segmentation on simulated ultrasonic wavefield images of a steady-state, select-tone excitation of a structural or mechanical component. One or more embodiments may employ a convolutional neural network (CNN), pre-trained on openly-available datasets, and trained by transfer learning on an augmented wavefield dataset, to localize and characterize defects or damage from inspection measurements of components.

21 Claims, 16 Drawing Sheets

(56) References Cited

U.S. PATENT DOCUMENTS

| | | | | |
|---|---|---|---|---|
| 2023/0107092 | A1* | 4/2023 | Jain | F03D 17/00 382/103 |
| 2023/0134372 | A1* | 5/2023 | Edwards | G06T 7/0004 382/103 |
| 2023/0232080 | A1* | 7/2023 | Kim | G06N 3/08 382/155 |
| 2023/0314386 | A1* | 10/2023 | Fisher | G06N 3/0464 702/35 |
| 2024/0193723 | A1* | 6/2024 | Zhang | G06T 5/70 |
| 2025/0352169 | A1* | 11/2025 | Takemoto | A61B 8/0825 |

* cited by examiner

| Parameter | Value | Dataset 1 | Dataset 2 | Dataset 3 | Dataset 4 | Dataset 5 |
|---|---|---|---|---|---|---|
| Number of defects | Variable | 1 | 1 | 1 | 0 | 1 |
| Transducer location | Variable | Center | Upper right quad. (4 locations) | Lower left | Upper right quad. (4 locations) | Center |
| Plate thickness | Variable | 10 mm | 10 mm | 2 ~ 9 mm | 1 ~ 10 mm | 10 mm |
| Plate thickness at defect | Variable | 1 ~ 9 mm | 1 ~ 9 mm | 1 ~ 8 mm | n/a | 1 ~ 9 mm |
| Defect location | Variable | Upper right quad. (9 locations) | Center | Center | n/a | Top edge |
| Defect shape | Variable | circle, square, rectangle | Circle | Square | n/a | Rectangle |
| Defect size (width) | Variable | 50 mm | 50 mm dia. | 10, 30, ..., 90 mm | n/a | 10, 20, ..., 60 mm |
| Dataset size | **Total: 503** | 243 | 36 | 130 | 40 | 54 |

FIG. 3G

DEEP LEARNING METHOD FOR DEFECT CHARACTERIZATION

CROSS-REFERENCE TO RELATED APPLICATIONS

The present application claims benefit of U.S. Provisional Application No. 63/320,124, filed Mar. 15, 2022. The contents of that provisional application are incorporated by reference in their entirety.

ACKNOWLEDGMENT OF GOVERNMENT SUPPORT

This invention was made with U.S. Government support under Agreement No. 89233218CNA000001 awarded by the Department of Energy to Triad National Security, LLC. The government has certain rights in the invention.

BACKGROUND OF THE INVENTION

Nondestructive evaluation (NDE) techniques have been used to identify structural flaws and defects, as part of structural health monitoring (SHM) practices. Flaws and defects can include corrosion, cracks, holes, delamination, warping, and various other kinds of surface imperfections. Acoustic steady-state excitation spatial spectroscopy (ASSESS) is an ultrasonic NDE technique that utilizes full-field, select-tone, steady-state surface response measurements to rapidly visualize and characterize defects in structural and mechanical components. In ASSESS, select-tones of ultrasonic excitation are applied to the surface of a structure by a piezoelectric transducer (PZT), and a scanning laser Doppler vibrometer (LDV) obtains the steady-state, surface response of the structure to the excitation.

ASSESS performs full-field inspection more rapidly than other ultrasonic NDE techniques. ASSESS has several limitations, however. Among these are increased processing time for performing NDE on larger structures; limited accuracy and spatial resolution when applied to smaller defects (on the order of one wavelength in size); and inaccuracies in the vicinity of edges of structures under examination. The inaccuracies around the edges can arise, among other things, when application of a spatial Fourier transform is part of the analysis.

It would be desirable to provide a method and system to address the above and other issues in NDE techniques.

SUMMARY OF THE INVENTION

In view of the foregoing, embodiments of the present invention provide a method that employs deep learning algorithms to perform NDE on structural and mechanical components. Training data for the deep learning system can include ASSESS measurements, but in an embodiment also can use direct detection measurement of component thickness to indicate and quantify flaws and defects.

In embodiments, a deep learning system, such as a U-Net style convolutional neural network (CNN), can improve the processing speed and spatial resolution of current ASSESS analysis techniques by performing semantic segmentation on simulated ultrasonic wavefield images of a steady-state, select-tone excitation of a component. In an embodiment, regions or pixels in an image may be classified and in some cases color-coded by class or object type. In an embodiment, transfer learning may be performed on an augmented wavefield dataset to localize and characterize defects in components of various materials. In an embodiment, the deep learning system may recognize wave pattern features directly from a steady-state ultrasonic wavefield image, and may classify regions of the image by component thickness, on a pixel-by-pixel basis, to visualize and quantify defects or flaws, as well as damage.

BRIEF DESCRIPTION OF THE DRAWINGS

Embodiments according to aspects of the present invention now will be described in detail with reference to the accompanying drawings, in which:

FIGS. 3A-3G are a more detailed flow chart, accompanying diagrams, and a table depicting operation of one aspect of the inventive method and system according to an embodiment;

FIGS. 7A-1 through 7F-3 are diagrams depicting results of the inventive method and system according to an embodiment;

DETAILED DESCRIPTION OF EMBODIMENTS

The following description refers in places to a convolutional neural network (CNN) or a fully convolutional neural network (FCN) as exemplary deep learning systems. However, ordinarily skilled artisans will appreciate that a deep learning system in accordance with embodiments of the present invention may be implemented in any of a variety of types of artificial neural networks and other deep learning systems. Also, as discussed herein, the inventive method according to an embodiment can be applied to inspection measurements to identify either manufacturing defects or damage to the system after manufacturing.

Accordingly, where the term "defects" appears alone, the term should be understood to encompass both defects and damage.

Figure 1:
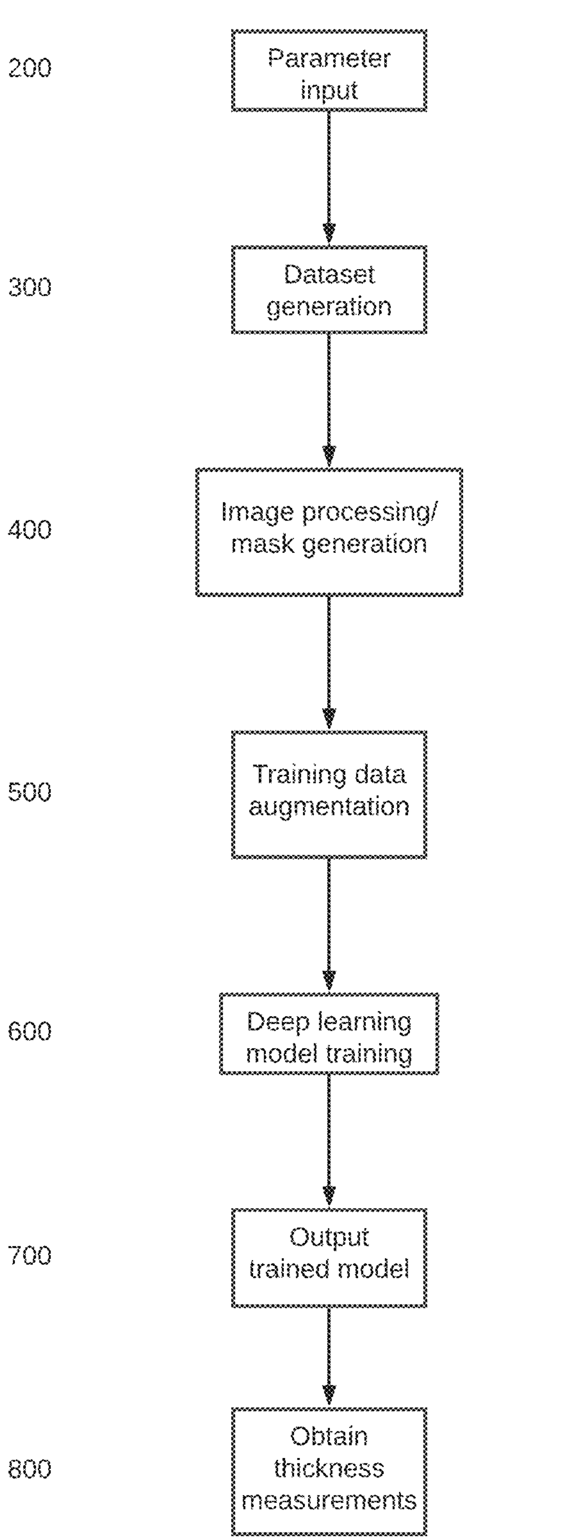
FIG. 1 is a flow chart depicting overall operation of the inventive method and system according to an embodiment.

FIG. 1 is a flowchart depicting the overall training and implementation process for the deep learning system according to an embodiment. Different portions of FIG. 1 will be described in more detail below with reference to FIGS. 2-7F-3.

In FIG. 1, at 200, parameters to be used in generating a dataset for training the deep learning system are input. At 300, the dataset is generated. At 400, image processing on the dataset is performed to generate samples to be used in training. At 500, data augmentation is performed on the samples. At 600, the deep learning model is trained. At 700, the deep learning model is output. At 800, surface response measurements and/or ASSESS measurements may be input into the deep learning model. At 900, thickness measurements are taken.

In the following description and accompanying drawings, there may be references to plates or plate-like or substantially planar structures or components. It should be understood that embodiments of the invention are not limited to planar or substantially planar structure, but rather are applicable more generally to structural and mechanical components. Additionally, there may be references herein to particular types of materials, such as aluminum. It should be understood that embodiments of the invention are not limited to particular materials, but rather are applicable more generally to other types of metals and materials, such as polymers. Accordingly, the embodiments herein are exemplary, and are not exhaustive.

A method in accordance with aspects of the present invention is a trained and deployable deep learning model that can produce component thickness maps from an ultrasonic wavefield measurement. Deep learning models often involve training on a large dataset. Because acquiring sufficient measurement samples of component thickness maps can be challenging, it can be useful to generate some of the sample component thickness maps as simulations. In an embodiment, simulations may be performed, for example using finite element analysis (FEA) software, to increase a number of available samples in a training set.

Figure 2:
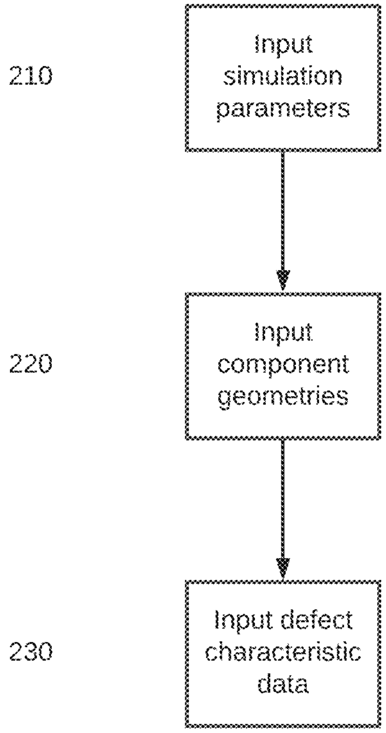
FIG. 2 is a more detailed flow chart depicting operation of one aspect of the inventive method and system according to an embodiment.

FIG. 2 is a high-level flow chart depicting parameter inputs for the deep learning model. At 210, as was just noted, where necessary or appropriate in order to generate a sufficiently large training set, simulation parameters may be input. As noted below with reference to FIGS. 3A-3G, particularly FIGS. 3B-3F, simulation parameters may include different locations and numbers of transducers relative to a particular component. For example, where a defect is largely linear in shape, placing a transducer to one side of the defect can yield certain measurement data. Placing the transducer in line with the defect can yield different measurement data. Placing multiple transducers in different locations relative to a component also can yield different measurement data.

Simulation parameters also can include component geometries and different locations, numbers, and types of defects or damage. Depending on the embodiment, simulation inputs may include a simulation scheme that varies defect or damage characteristics (shape, depth, location, and the like), among other things, to correspond to different real-world component scenarios. In an embodiment, defects or damage may be prescribed on the backs of the components so as to mimic hidden structural defects or damage. This mimicking may be accomplished by altering the components' thickness using computer-aided design (CAD) software. In an embodiment, a programming language such as Python may be used to compile and execute batch run steady-state ultrasonic simulations for each component to generate a dataset. Ordinarily skilled artisans will appreciate that other languages, such as R, may be employed usefully.

With suitable software, simulation data for training may be generated relatively easily, and can be provided more plentifully than can experimental data. In an embodiment, it can be helpful to use experimental data. Accordingly, in FIG. 2, for input of experimental data as opposed to simulation data, at 220 component geometries may be provided. Component geometries can be planar, or can be curved to some extent. At 230, defect or damage characteristic data may be provided. Such data may include numbers of defects as well as shape, depth, location, and the like of the defect or damage. Placement of a transducer, such as a piezoelectric transducer (PZT), also can be varied, as discussed above regarding simulation parameters.

In an embodiment, a training dataset may be generated via different types of simulation schemes. Different simulations and geometric parameters may be provided, and may be varied to imitate thickness damage or defects that can occur in plate-like structures. In different embodiments, parameters that can be studied may include, but are not limited to transducer excitation frequency, transducer location, number of defects or damaged regions, component thickness, defect or damage location, defect or damage geometry, component size, and component material. Among these, component material, component size, and transducer frequency were held constant. In the examples discussed below, thin plate-like structures were modeled as 400 mm×400 mm and assigned as generic aluminum alloy material within ANSYS, which is a FEA program to perform structural simulations. Companies other than ANSYS, such as Autodesk, also provide such FEA programs. Ordinarily skilled artisans will be familiar with such alternatives. In the examples discussed below, the excitation frequency was set at 80 kHz. Five datasets were devised to account for variability in all other parameters, as summarized in FIG. 3G.

Figure 3A:
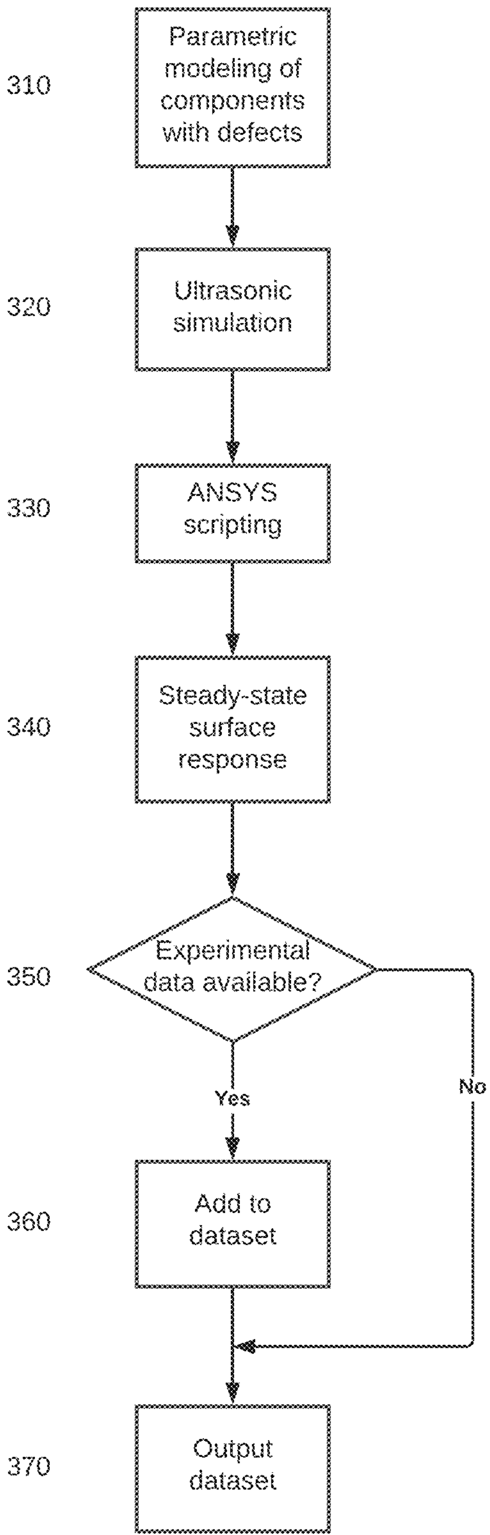

In the flow chart of FIG. 3A, a dataset may be generated. In an embodiment, the generated dataset may be partly or totally simulated. In other embodiments, some of the dataset may come from experimental data. Focusing for the moment on simulation generated data, ordinarily skilled artisans will appreciate, for example, that different simulation and geometric parameters may be varied to imitate thickness damage or defects that can occur in plate-like structures. At 310, parametric modeling of components with defects may be performed as an initial step in dataset generation. In an embodiment, among the parameters which may be included are transducer excitation frequency, transducer location, number of defects or damage regions, component thickness, defect or damage location and geometry, and component size and material. Other parameters may be considered, as ordinarily skilled artisans will appreciate. In an embodiment, among the just-mentioned parameters, component material, component size, and transducer frequency may be held constant. In an embodiment, components may be modeled at a particular size, and may be assigned as a type of material within FEA software. In an embodiment, an excitation frequency may be set, as was noted earlier.

At 320, simulation of ultrasonic excitation may be carried out. An example of this is discussed below. FEA software may be used at various stages of dataset generation, including at 330, where scripting is carried out to perform simulations for all of the components in the generated dataset discussed below. All of the variants mentioned above may be iterated upon to generate data in the dataset. Python would be an example of a scripting language, but ordinarily skilled artisans will appreciate that other languages may be employed usefully. At 340, a steady-state surface response wavefield image may be produced.

It may be that related and/or otherwise relevant experimental data also may be available to be part of the dataset. Accordingly, in an embodiment, at 350, if experimental data is available, at 360 it is added to the dataset, and the overall dataset is output at 370. Alternatively, if experimental data is not available for the dataset, the overall dataset output at 370 will contain only simulated data.

Figures 3B, 3C, 3D, 3E, 3F:
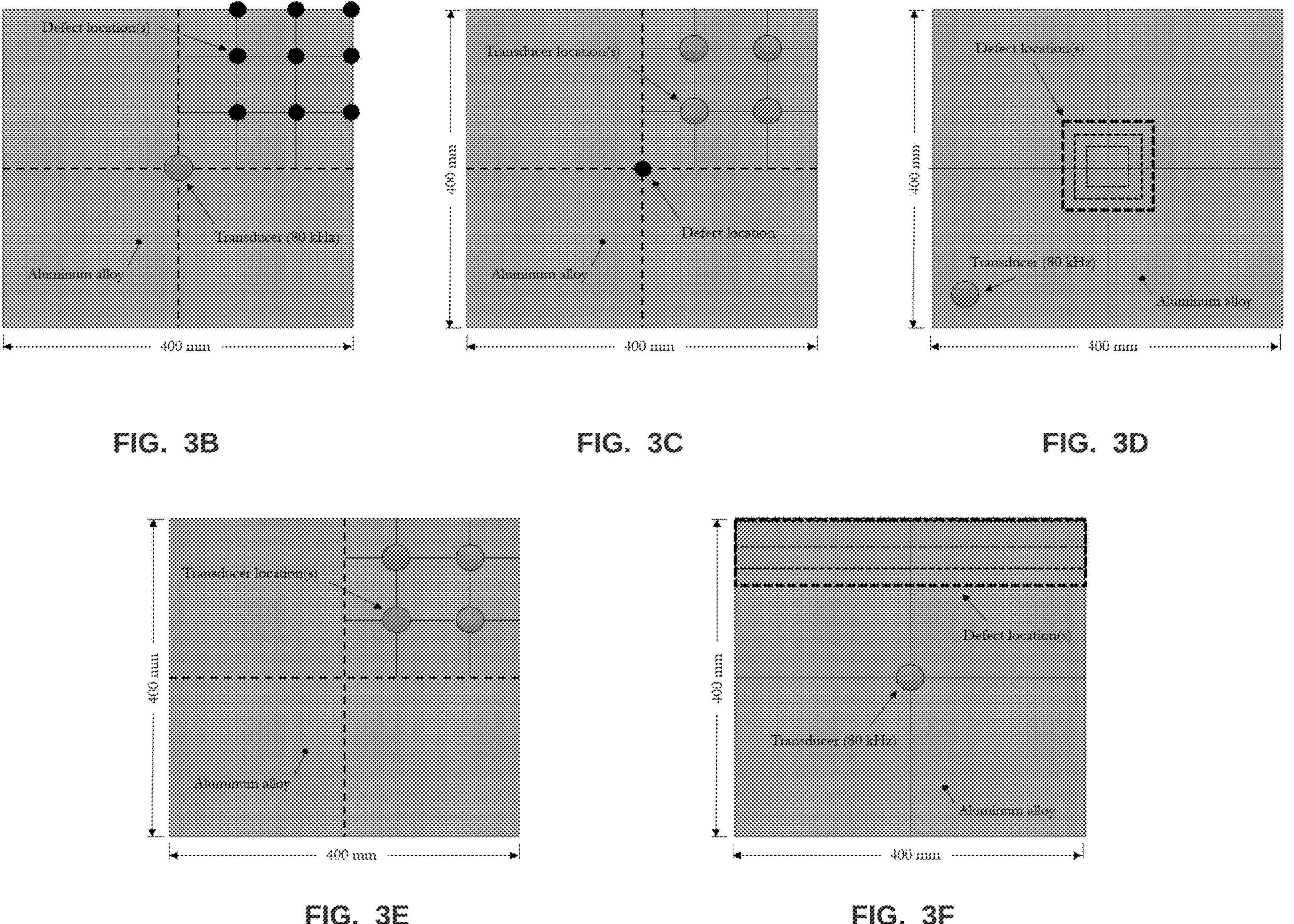

FIGS. 3B-3G provide an example of assignment of these parameters to generate a dataset. In the following discussion, which provides a non-limiting example, the component which is the subject of the simulated dataset generation is a 400 mm×400 mm aluminum alloy material. This data may be provided to ANSYS software, as noted earlier. The excitation frequency was set at 80 kHz. Five datasets were devised to account for variability in all other parameters, as summarized in FIGS. 3B-3G. In FIG. 3B, dataset 1 shows one defect in one of nine locations in the upper-right quadrant of the component. Each of the nine locations has nine different thicknesses and three different shapes. In FIG. 3C, for dataset 2, the transducer may be placed in one of four locations in the upper right quadrant, and the component thickness at the defect was varied between 1-9 mm. In FIG. 3D, for dataset 3, one square defect is at the center of the component and the characteristic length is varied in 20 mm increments from 10 mm to 90 mm. The thickness reduction percentage at the defect may be kept to roughly 50%. In FIG. 3E, dataset 4 consists of 10 different component thicknesses, each with the transducer at one of four locations in the upper-right quadrant. In FIG. 3F, for dataset 5, one rectangular defect is placed at the top edge of the component, and the component width is varied in 10 mm increments from 10 mm to 60 mm.

FIG. 3G summarizes the contents of FIGS. 3B-3F in a table which shows a size of each dataset. The total dataset size for all five datasets is 503.

A combination of datasets like this (other useful dataset combinations being apparent to ordinarily skilled artisans in light of this explanation) can expose a deep learning system such as a CNN to a variety of component damage and experimental setup scenarios, making the CNN invariant to shape, size, location, orientation of the defect, and even to number of defects, including when there might be multiple defects on top of each other on a component. The CNN also will be invariant as to location of the transducer on the component. In this way, the CNN can learn general characteristic features inherent within the different wavefield images, rather than the specific shape or size of any particular defect.

In examples to be discussed herein, component geometry files were created in CAD. A steady-state ultrasonic excitation response of each component was obtained using an FEA harmonic response simulation in ANSYS. Ultrasonic excitation was simulated by applying a 0.1 MPa pressure at 80 kHz on the top face of the transducer. A constant damping ratio of $\zeta=0.001$ was used in the analysis. The mesh size was tuned to 2 mm to obtain accurate solutions at reasonable computation times. ANSYS parametric design language (ADPL) commands were used to export the real and imaginary components of the steady-state harmonic response of the component for further processing. Finally, ANSYS Python scripting was used to automate the simulation process for all 503 models in the dataset.

Figure 4A:
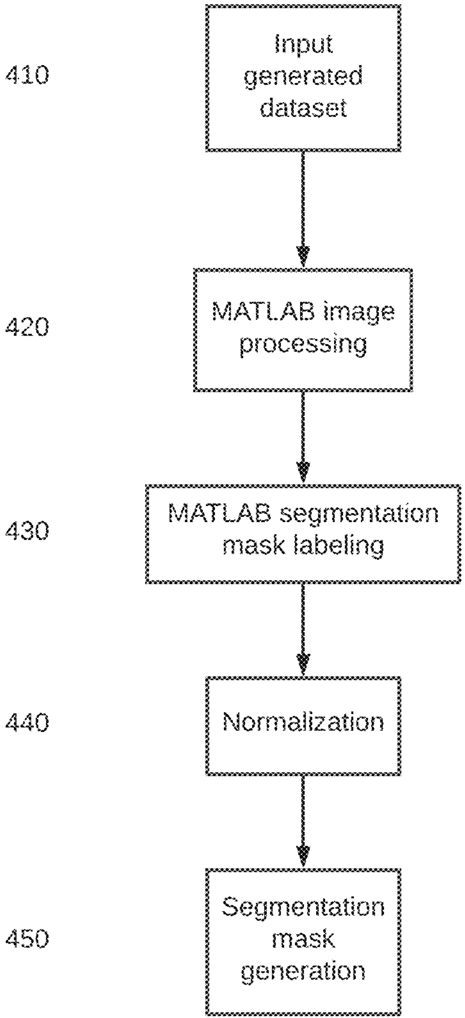
FIG. 4A is a more detailed flow chart depicting operation of one aspect of the inventive method and system according to an embodiment.
Figure 4B:
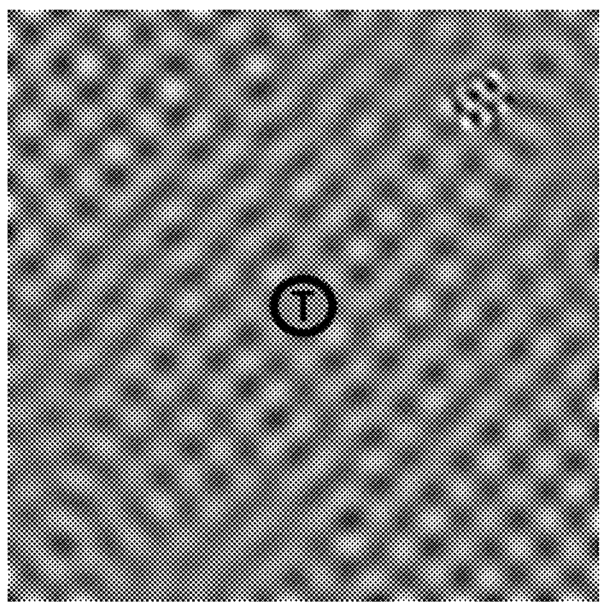
FIG. 4B shows a wavefield image according to an embodiment.
Figure 4C:
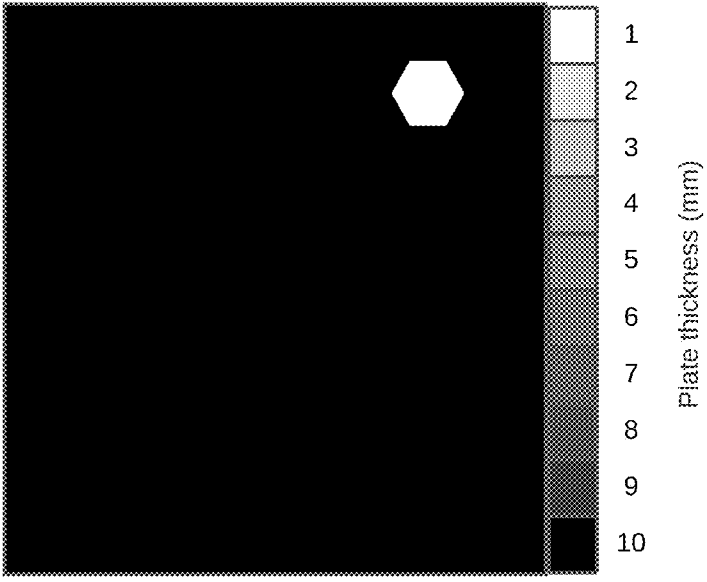
FIG. 4C shows a segmentation mask according to an embodiment.

FIGS. 4A-4C provide an example of image processing used in dataset generation according to an embodiment. In FIG. 4A, at 410, real and imaginary components of a steady-state harmonic response of a component may be read directly into a program such as MATLAB for initial processing. MATLAB is but one choice for this initial processing. Other programs, including by way of non-exhaustive examples, Mathematica, Scilab, TensorFlow, and Fusion 360, also may perform this initial processing.

In different embodiments, the initial processing at 420 may include, for example, filtering out surface mesh points. The result of the filtering may be interpolated onto an evenly spaced grid corresponding to a size of a component under analysis (in an embodiment, 400×400 mm). At 430, the resulting data may be normalized, and at 440, a grayscale wavefield image may be generated for all of the real component, imaginary component, and magnitude of the steady-state response of the component for each simulation. At 450, segmentation masks of the component may be generated, to indicate locations and thicknesses of defects on a pixel-by-pixel basis from the provided CAD file geometry. In an embodiment, a resolution of 1 $mm^2$ to one pixel may be used for the segmentation masks. In the example being discussed here, there are 10 component thickness classes to identify in each image. FIG. 4B shows a resulting wavefield image.

For example, in a given 10 mm thick component with no defects, every pixel value in the segmentation label image may have an RGB or shading value equivalent to its class identifier. If a thickness defect, such as a defect resulting from corrosion or material removal, were introduced to the back of the component, reducing a thickness of the component in that region to be 7 mm, then all pixel values in that region of the segmentation label image would have a different RGB or shading value. In this manner, the deep learning model may be provided with wavefield images of a component, and may be told (via the label images) which wave patterns and regions in the image correspond to which component thickness value. FIG. 4B shows an example of a grayscale wavefield image and FIG. 4C shows a segmentation mask for a 10 mm component with a 1 mm thick hexagonal defect in the upper-right corner.

FIG. 4C is gray-shaded for ease of understanding. 10 mm corresponds to black and 1 mm corresponds to white. For example, in a given 10 mm thick component with no defects, every single pixel value in the segmentation label image would be black. If a thickness defect, such as that which would result from corrosion or material removal, were introduced to the back of the component, causing the thickness of the component in that region to be reduced to 7 mm, then all pixel values in that region of the segmentation label image would be light gray according to the scale. Consequently, in an embodiment, the deep learning model may be given wavefield images of a component, and will be told (via the label images) which wave patterns and regions in the image correspond to which component thickness value.

Figure 5:
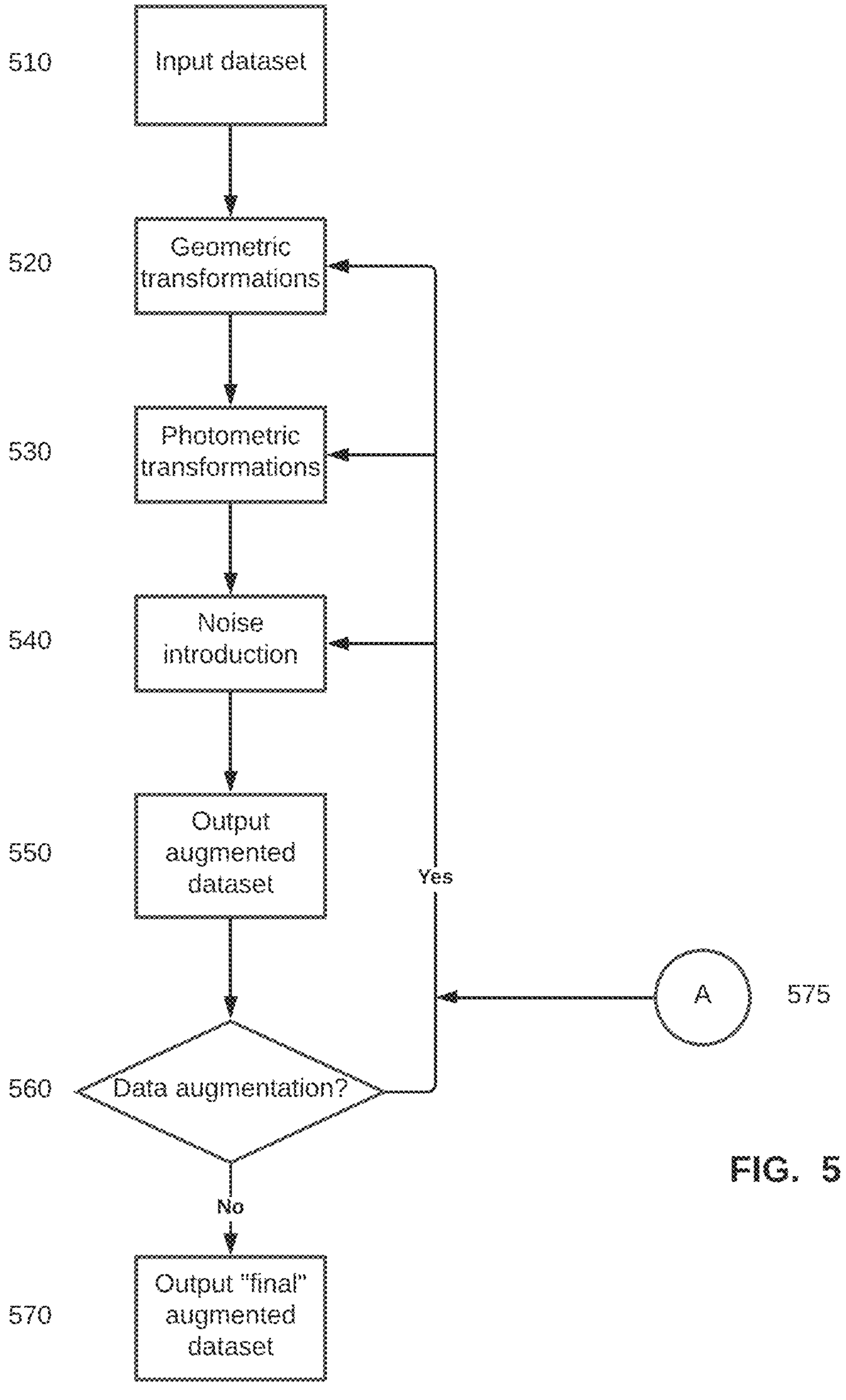
FIG. 5 is a more detailed flow chart depicting operation of one aspect of the inventive method and system according to an embodiment.

FIG. 5 is a high-level flow chart depicting a data augmentation process for generating additional or new data from existing data, in a physics-conserving manner. In different embodiments, data augmentation may be used to increase dataset size. Alternatively, data augmentation may be performed between training rounds to improve the accuracy and generalizability of a deep learning system such as a CNN. Data augmentation techniques on images may include geometric transformations such as windowing, clockwise or counterclockwise rotating, horizontal, vertical, or transverse flipping. Data augmentation techniques also can include phase shifting or temporal translation of a wavefield image, including different instances of the same measurement in time. In this manner, it is possible to combine deep learning model outputs from a plurality of ultrasonic wavefield images generated from a phase shift or a temporal translation of an instance of the ultrasonic wavefield. With respect to embodiments of the present invention, augmentation techniques that can alter or distort an appearance of propagating waves in a wavefield image should be excluded, since the goal is to recognize features in a simulated or experimentally collected ultrasonic wavefield measurement.

Looking at FIG. 5, at 510 the dataset to be augmented may be input. At 520, one or more geometric transformations of the type mentioned above may be performed. At 530, one or more photometric transformations of the type mentioned above may be performed. At 540, noise may be introduced, for example, Gaussian noise. It should be noted that the types of transformations or noise may be varied.

It is not critical to follow the sequence 520-540 set forth in FIG. 5. Thus, for example, noise may be introduced before any geometric or photometric transformations are carried out. Moreover, geometric transformations need not precede photometric transformations. In an embodiment, geometric transformations, such as horizontal or vertical flipping between training rounds may be applied.

When augmentation is complete, the augmented dataset may be provided at 550. At 560, if there is to be further augmentation, flow can return to any or all of 520-540, in any order. In an embodiment, augmentation can occur while data augmentation is being carried out, in a sort of out-of-order manner, with a different kind of augmentation being added after the various kinds of augmentation have been carried out. In different embodiments, augmentation may be carried out more conventionally, before a round of training, or between rounds of training (see FIG. 6A, for example). In that event, at 575, flow returns from training, and can go to any or all of 520-540, in any order. If there is to be no more augmentation at this point, then a "final" augmented dataset is output at 570. "Final" is in quotes because, as will be seen with respect to FIG. 6A, before a round of training for the deep learning model, or between training rounds, further augmentation may be performed, so that the dataset may be augmented further.

In an embodiment for purposes of the present discussion, the previously-mentioned dataset of 503 items was doubled in size by applying a 180° rotation to the entire dataset. The resulting dataset was doubled in size again by applying white Gaussian noise with a variance of $\sigma^2=0.004$ to all of the images, for a total dataset size of 2012. In between training rounds, there may be random horizontal or vertical flipping of selected images before passing them through the network. The combination of the augmentation techniques described here and the quadrant-based simulation scheme described with respect to FIGS. 3B-3F can expose the deep learning system to defects in all quadrants of a component under examination, without duplication and with some levels of noise.

After processing the images and creating the segmentation maps (FIG. 4A), a dataset size may be increased using data augmentation techniques (FIG. 5). The deep learning model then can be trained on the augmented dataset. In an embodiment, learning rate optimization may be employed for the training. In an embodiment, various kinds of software, including but not limited to open source software, may be used. After deep learning training, the model may be deployed.

Figure 6A:
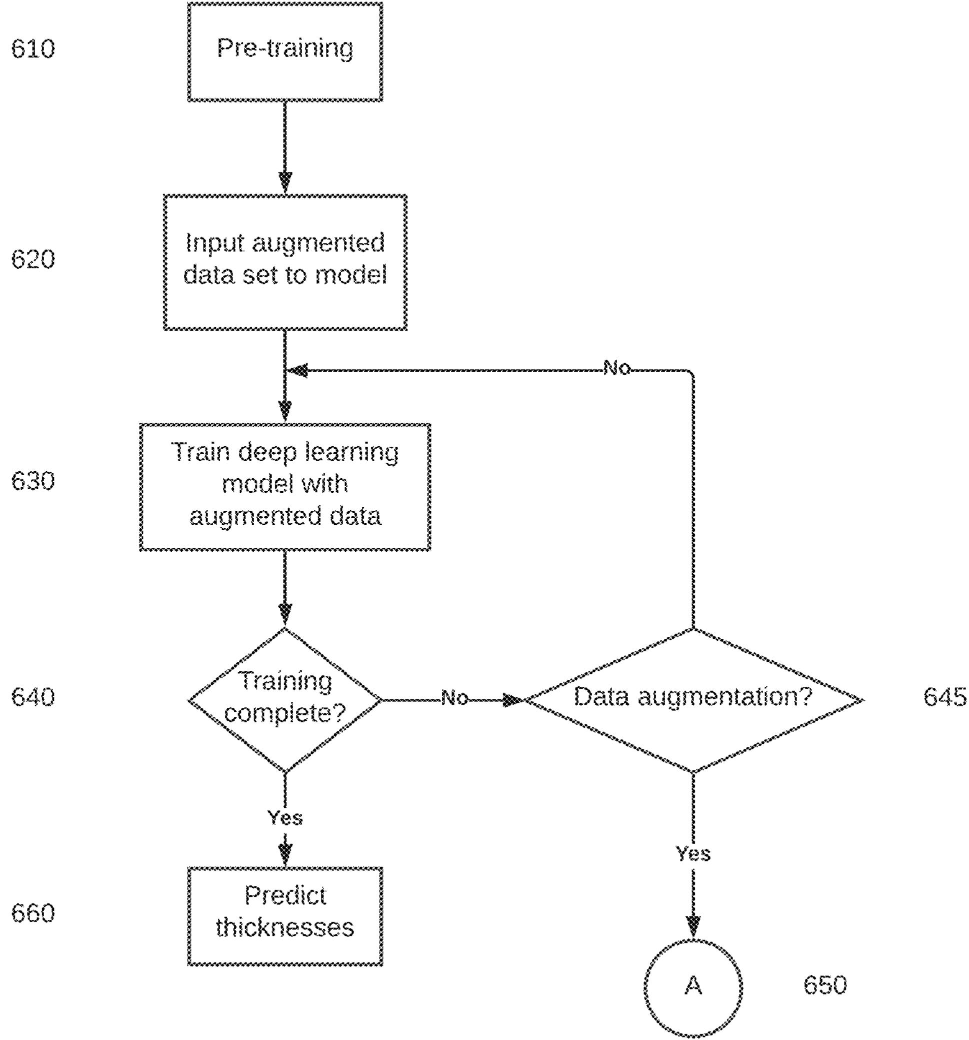
FIG. 6A is a more detailed flow chart depicting operation of one aspect of the inventive method and system according to an embodiment.

FIG. 6A describes deep learning training at a high level. In an embodiment, the training may be effected with a deep learning library such as fast.ai, in conjunction with another deep learning library such as PyTorch. Ordinarily skilled artisans will recognize that alternatives to fast.ai and/or PyTorch also can be used to good effect. Exemplary, non-limiting alternatives to fast.ai may include Analytics Vidhya, among others. Exemplary, non-limiting alternatives to PyTorch may include TensorFlow, Keras, and MXNet, among others.

Looking again at FIG. 6A, at 610 pretraining on an encoder side of a deep learning system such as CNN may be performed, using for example the ImageNet database. Ordinarily skilled artisans will appreciate that other image databases, such as MS-COCO and various versions of MNIST may be used. In an embodiment, pretraining need not be performed. At 620, the augmented dataset resulting from the processing in FIG. 5, for example, may be input to the deep learning model, and at 630, training may be carried out on the deep learning model. As will be discussed in more detail with respect to FIGS. 6C to 6E, training may be iterative. At 640, determinations may be made as to completeness of training. If training is complete, at 660 the model may be used to predict thicknesses in plate-like structures and other planar or nearly planar structures. If training is not complete, an additional training round will be carried out. At 645, a determination is made whether data augmentation should be performed between rounds. If so, at 650 flow returns to 575 in FIG. 5. If there is no data augmentation, flow returns to 630 for an additional training round.

Figure 6B:
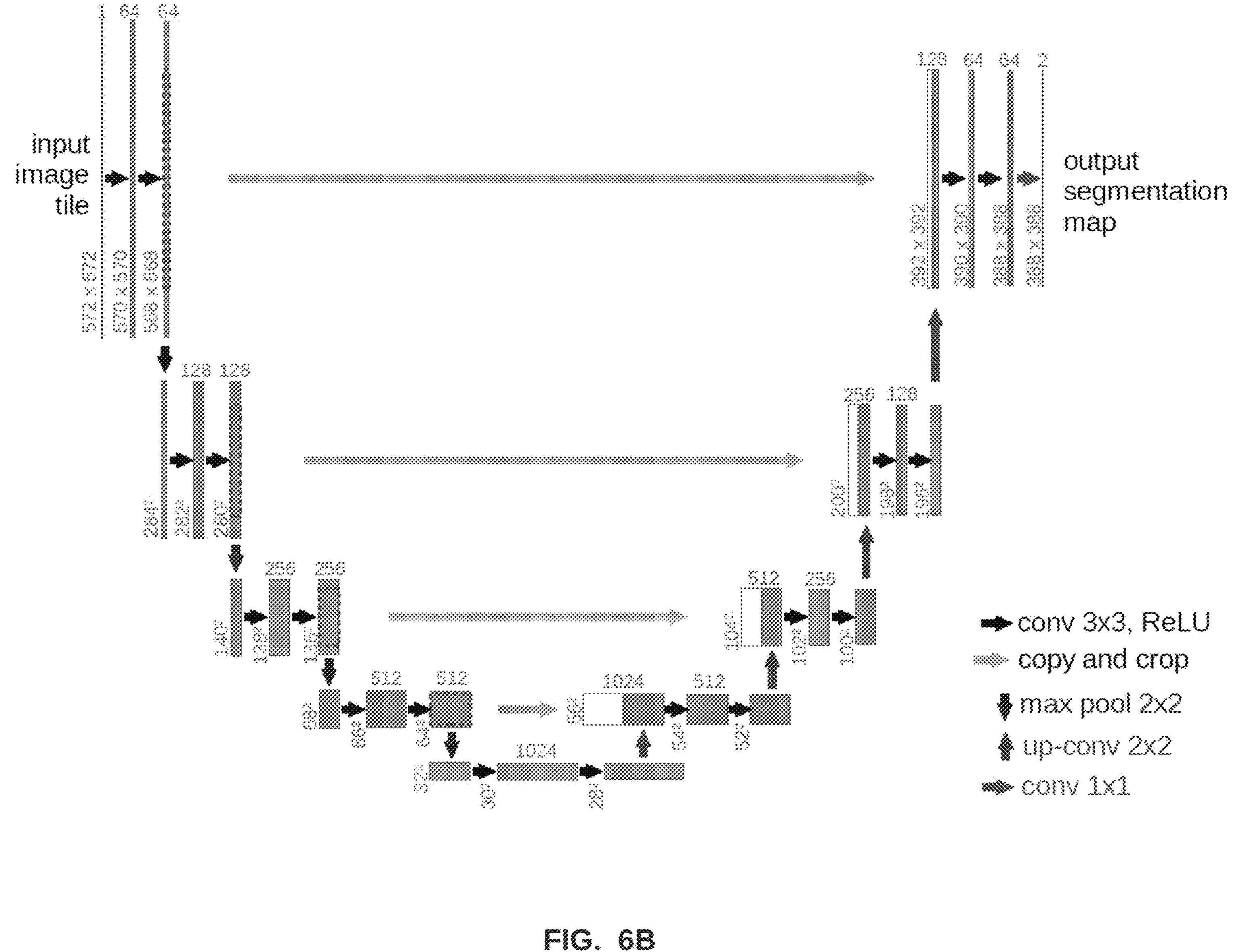
FIG. 6B is a diagram of a deep learning system according to an embodiment.

FIG. 6B shows an example of U-Net style architecture to accomplish image segmentation according to an embodiment. In FIG. 6B, there is symmetry between down-sampling (encoder) and up-sampling (decoder) paths of the neural network. In the encoder, feature maps may be carried over to the decoder via the horizontal paths shown in FIG. 6B, to improve pixel-wise prediction and resolution in the output segmentation map. The U-Net type model shown as an embodiment is a type of FCN, in which all model parameters in both the encoder and decoder may be optimized by training the network on a labeled image segmentation dataset. Other architectures will be apparent to ordinarily skilled artisans. For example, in an embodiment, ResNet architecture may be employed, and may be trained on a publicly available dataset such as ImageNet.

Referring again to FIG. 6B, in an embodiment the U-Net based architecture may include 36 convolutional layers in the encoder and 18 convolutional layers in the decoder. In an embodiment, as an example of transfer learning, the encoder may be pre-trained on the ImageNet database before being trained on the ultrasonic wavefield dataset. Depending on the size of the ultrasonic wave field dataset, that dataset may be split into a training portion and a validation portion. One such split might be 80-20, but ordinarily skilled artisans will appreciate that other splits may be worthwhile.

Figure 6C:
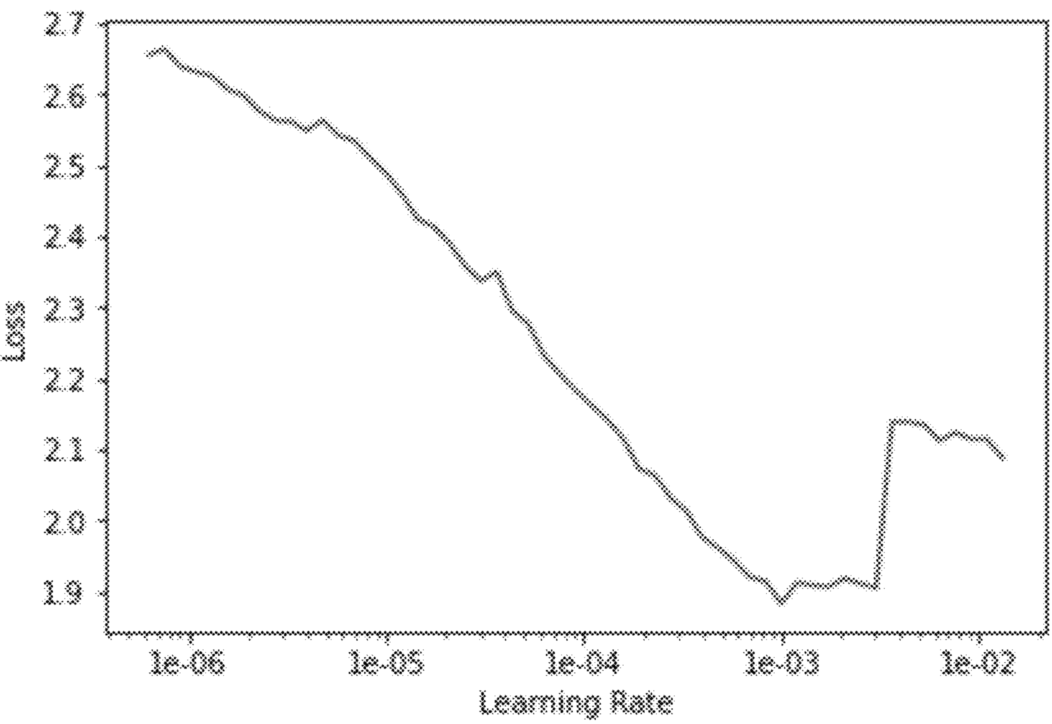
FIGS. 6C-6E are graphs depicting different types of calculations according to an embodiment.

Before training, it is possible to improve or even optimize a learning rate of the model by plotting a value of a loss function as a function of learning rate using tools within a library such as fast.ai. FIG. 6C shows an example of such a graph. The learning rate is known as a hyperparameter that controls a step size of gradient descent on the overall training loss function. A user may set this learning rate. In an embodiment, a maximum learning rate may be chosen in which a maximum rate of decrease in the loss function with respect to the learning rate is experienced. As an example, this may occur in a region of the steepest negative slope in FIG. 6C.

Figure 6D:
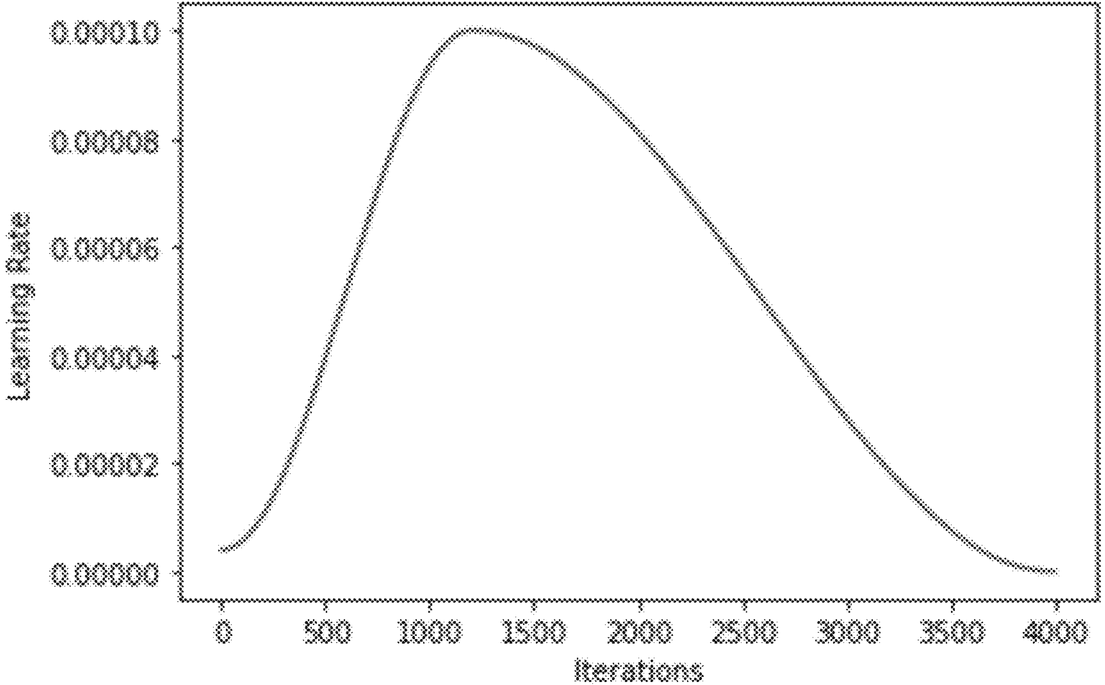

The learning rate may be varied smoothly during training iterations, up to the maximum learning rate, and then back down to traverse the loss landscape efficiently, as FIG. 6D depicts. In an embodiment, varying the learning rate can avoid small local minima in the loss function, while at the same time ramping up the learning rate, and approaching a more global minimum in the loss function more smoothly while refining the learning rate back down.

Figure 6E:
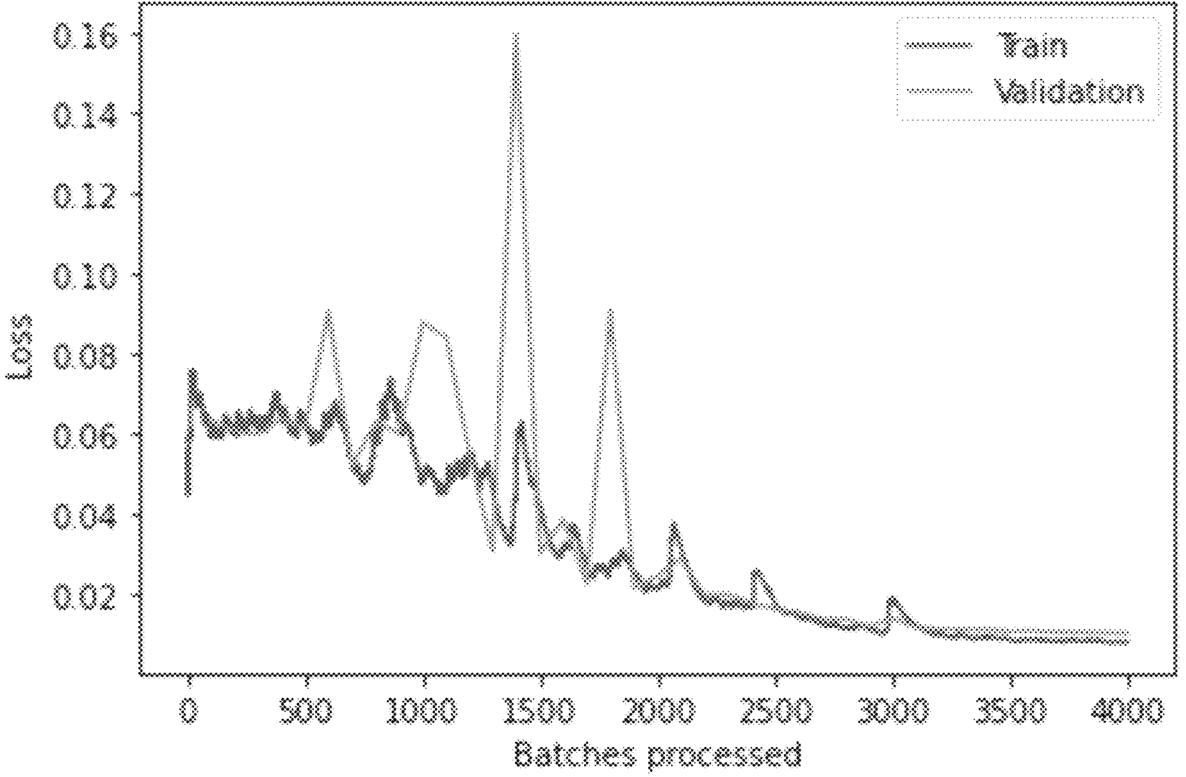

In an embodiment, after optimizing the learning rate, the deep learning network may be trained on an ultrasonic wavefield dataset in two consecutive phases. During a first phase, all parameters in the hidden layers of the network may be frozen, while the output layer of the network, which is responsible for the final pixel-by-pixel classification, is left unfrozen. The learning rate may be optimized again after the first phase of training to account for change in parameters at the output layer. During the second phase, all hidden layers may be unfrozen, and the entire network trained again on the dataset. FIG. 6E shows training and validation set losses over training iterations.

During the early iterations, the loss may be seen to spike up and down rapidly because of the increased learning rate, with an overall decreasing trend. During later iterations, the loss may be seen to decrease more steadily, and to progress toward a more global minimum as the learning rate is refined. The training process may be continued until the loss levels off at an asymptotic value, as the right-hand side of FIG. 6E shows.

After completing training of the deep learning system, a metric such as intersection over union (IoU) can provide useful information regarding performance of a particular deep learning system on a validation data set.

FIGS. 7A-1 through 7F-3, discussed below, show results of tests with different respective defects on a test component. Wavefield images containing these various defects were run through the CNN system. Results were gray-scale coded linearly with component thicknesses from 1 mm to 10 mm. Each of the test geometries is a nominally 10 mm thick, 400 mm×400 mm aluminum component excited at a frequency of 80 kHz.

Figures 1, 2, 3, 7A, 7B:
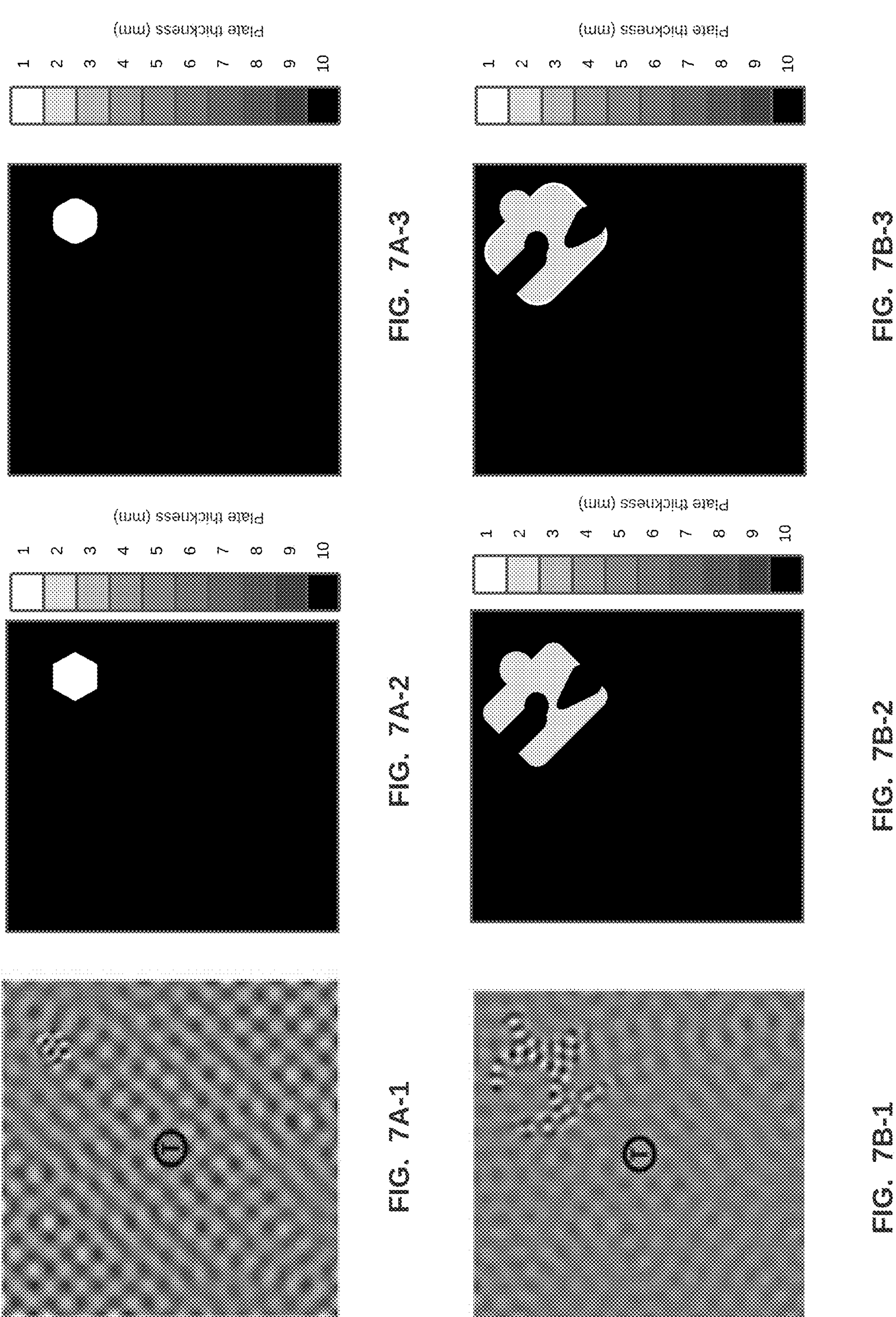

FIG. 7A-1 shows a wavefield image of a component with a small hexagonal defect in the upper-right corner of the component with a component thickness in the defect region of 1 mm. The transducer T is labeled in the center of the component.

FIG. 7A-2 shows a ground truth image corresponding to the wavefield image of FIG. 7A-1. FIG. 7A-3 shows an image output from the deep learning system (in this embodiment, a CNN-based system). The image in FIG. 7A-3 is very similar to that in FIG. 7A-2. An advantage over the ASSESS approach is a lack of artifacts at edges of the component.

FIG. 7B-1 shows a wavefield image of a component with a small irregularly-shaped defect in the upper-right corner of the component with a component thickness in the defect region of 2 mm. The transducer T is labeled in the center of the component.

FIG. 7B-2 shows a ground truth image corresponding to the wavefield image of FIG. 7B-1. FIG. 7B-3 shows an image output from the deep learning system (in this embodiment, a CNN-based system). The image in FIG. 7B-3 is similar to that in FIG. 7B-2, but not as similar as FIG. 7A-2 is to FIG. 7A-1 because of the greater difference in the component thickness in the defect region in the FIGS. 7B-1 to 7B-3 images than in the FIGS. 7A-1 to 7A-3 images. Nevertheless, these results demonstrate that the CNN approach has learned the features of the wavefield image itself, rather than a geometry of defects in the training set used to train the system. The CNN approach retains its advantage over the ASSESS approach in the lack of artifacts at edges of the component.

Figures 1, 2, 3, 7C, 7D:
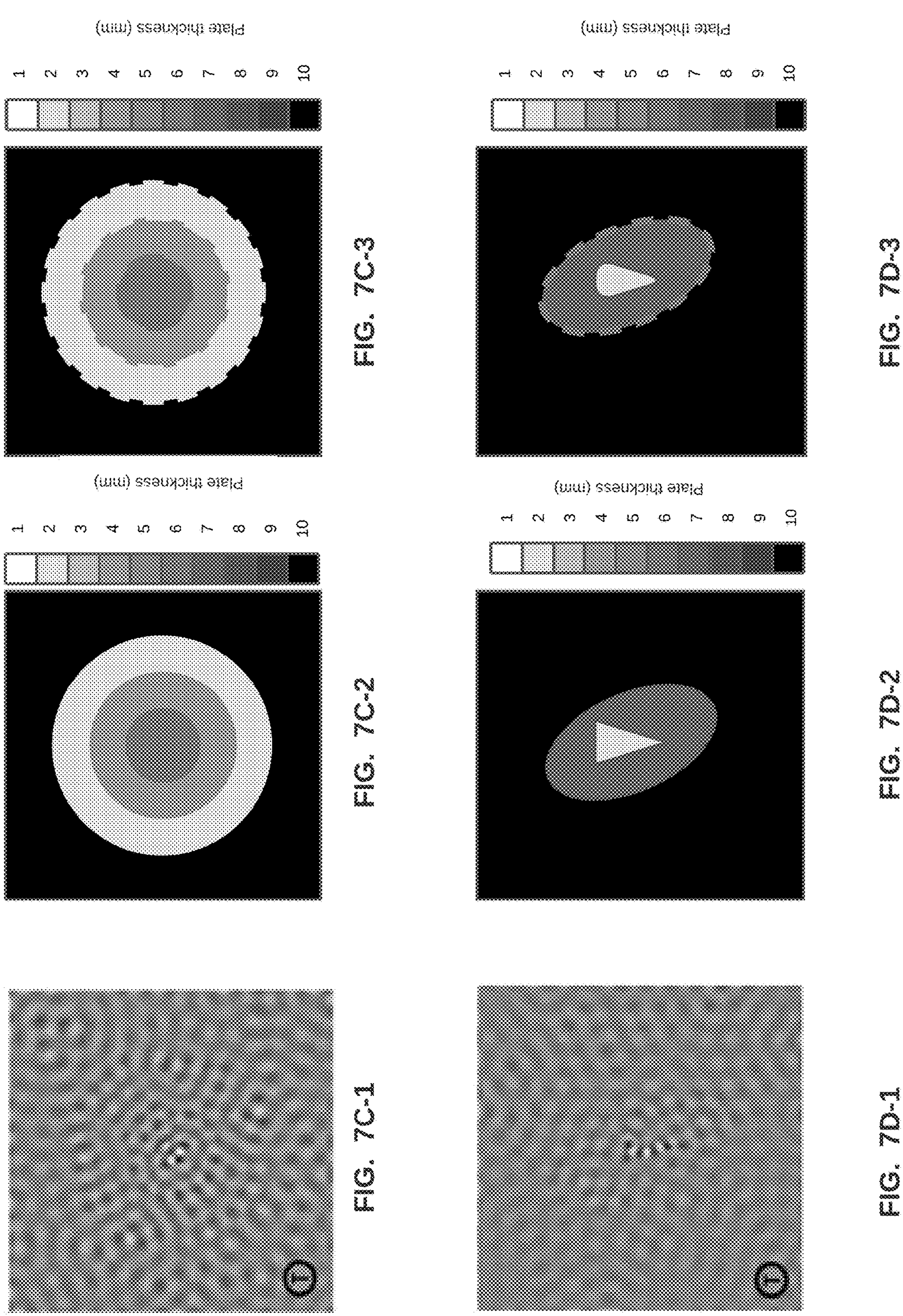

FIG. 7C-1 shows a waveform image with multiple nested defects of different thicknesses (2 mm, 4 mm, and 6 mm, respectively) in a component. The transducer T is labeled in a lower left-hand corner of the waveform image.

FIG. 7C-2 shows a ground truth image corresponding to the wavefield image of FIG. 7C-1. FIG. 7C-3 shows an image output from the deep learning system (in this embodiment, a CNN-based system). The image in FIG. 7C-3 is similar to that in FIG. 7C-2, but shows different levels of accuracy for the respective defects, the differences becoming more pronounced as the component thickness in the defect region increases. In this instance, the CNN was trained with single defects of a single thickness. However, the CNN was able to generalize so as to be able to handle the nested defects. As with FIGS. 7A-1 to 7A-3 and 7B-1 to 7B-3, these results also demonstrate that the CNN approach has learned the features of the wavefield image itself, rather than a geometry of defects in the training set used to train the system. Also, as with the images in FIGS. 7A-1 to 7A-3 and 7B-1 to 7B-3, the CNN approach continues to avoid the imposition of artifacts at the edges of the component as compared to an ASSESS analysis.

FIG. 7D-1 shows another waveform image with multiple nested defects of different thicknesses (2 mm and 6 mm, respectively) in a component. The transducer T is labeled in a lower left-hand corner of the waveform image.

FIG. 7D-2 shows a ground truth image corresponding to the wavefield image of FIG. 7D-1. FIG. 7D-3 shows an image output from the deep learning system (in this embodiment, a CNN-based system). The image in FIG. 7D-3 is similar to that in FIG. 7D-2, but shows different levels of accuracy for the respective defects, the differences becoming more pronounced as the component thickness in the defect region increases. In this instance, the CNN was trained with single defects of a single thickness. However, the CNN was able to generalize so as to be able to handle the nested defects. As with FIGS. 7A-1 to 7C-3, these results also demonstrate that the CNN approach has learned the features of the wavefield image itself, rather than a geometry of defects in the training set used to train the system. Also, as with the images in FIGS. 7A-1 to 7C-3, the CNN approach continues to avoid the imposition of artifacts at the edges of the component as compared to a wavenumber-based ASSESS analysis.

Figures 1, 2, 3, 7E, 7F:
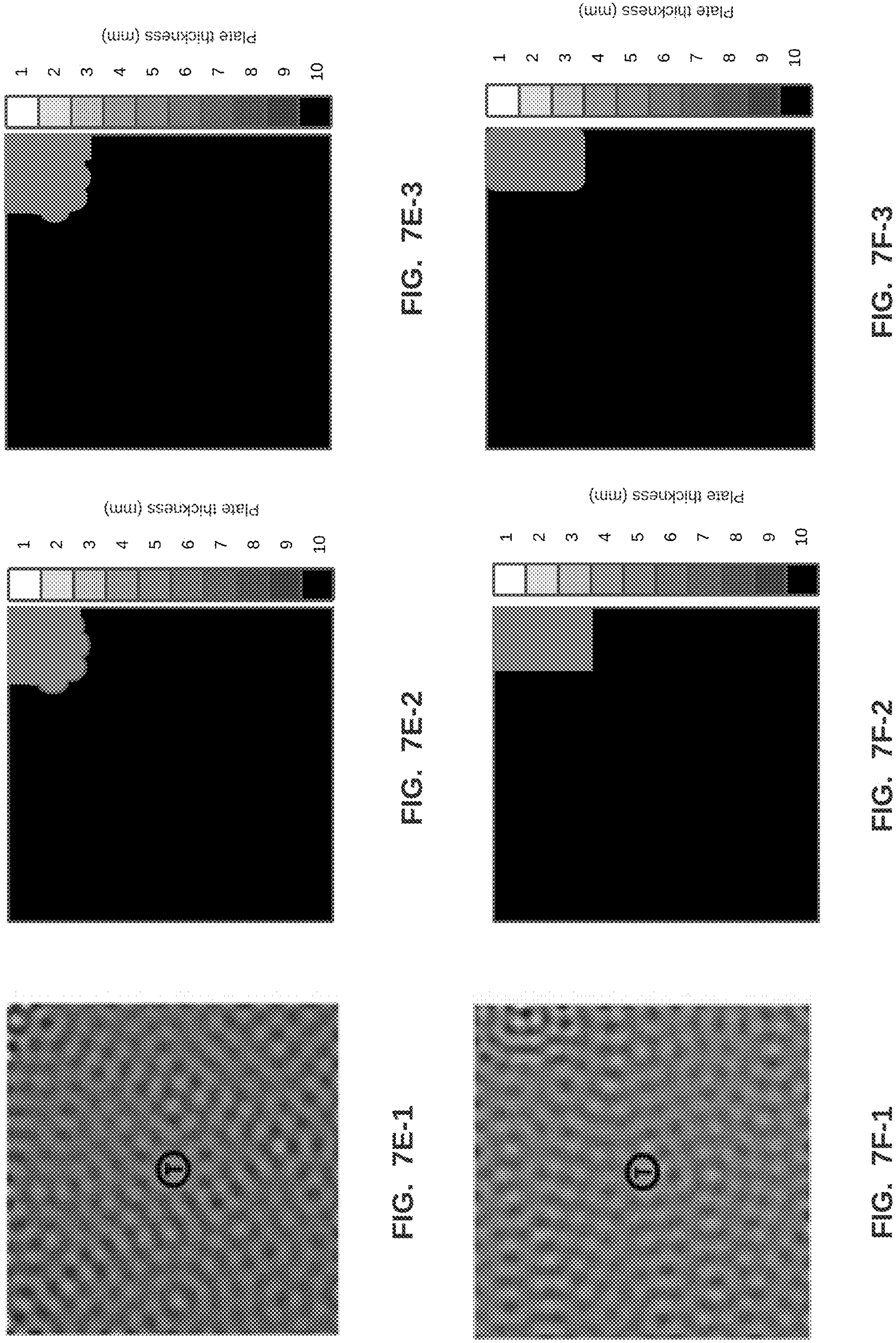

FIG. 7E-1 shows a waveform image with a small, irregularly shaped defect in the upper right corner of the component, with a defect thickness of 5 mm. The transducer T is labeled in a center of the waveform image.

FIG. 7E-2 shows a ground truth image corresponding to the wavefield image of FIG. 7E-1. FIG. 7E-3 shows an image output from the deep learning system (in this embodiment, a CNN-based system). The image in FIG. 7E-3 is similar to that in FIG. 7E-2, but shows different levels of accuracy for the respective defects, the differences becoming more pronounced as the component thickness in the defect region increases. As with the images in FIGS. 7A-1 to 7D-3, the CNN approach continues to avoid the imposition of artifacts at the edges of the component as compared to a wavenumber-based ASSESS analysis.

FIG. 7F-1 shows a waveform image with different nested defects of different thicknesses (2 mm, 4 mm, and 6 mm, respectively) in a component. The transducer T is labeled in a lower left-hand corner of the waveform image.

FIG. 7F-2 shows a ground truth image corresponding to the wavefield image of FIG. 7F-1. FIG. 7F-3 shows an image output from the deep learning system (in this embodiment, a CNN-based system). The image in FIG. 7F-3 is similar to that in FIG. 7F-2, but shows different levels of accuracy for the respective defects, the differences becoming more pronounced as the component thickness in the defect region increases. As with the images in FIGS. 7A-1 to 7E-3, the CNN approach continues to avoid the imposition of artifacts at the edges of the component as compared to a wavenumber-based ASSESS analysis.

Figure 8:
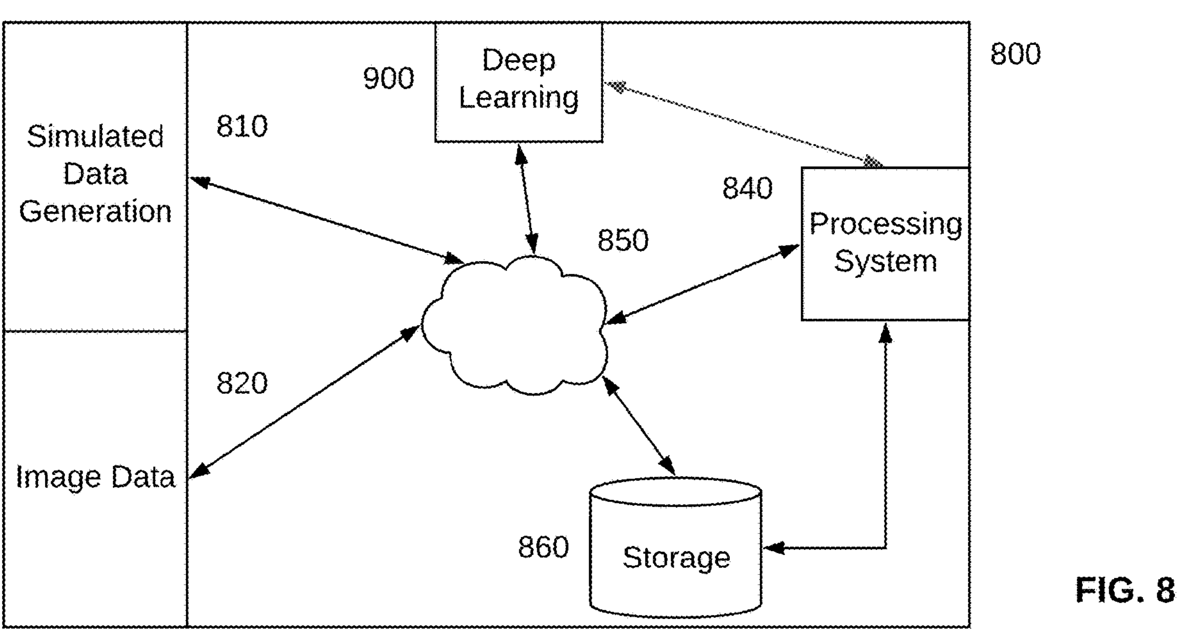
FIG. 8 shows a high-level example of a system for receiving input data and training a deep learning model according to an embodiment.

FIG. 8 is a high-level diagram of a system to train and implement a deep learning model according to an embodiment. In FIG. 8, in an embodiment, simulated data generation section 810 may provide simulated data to generate a dataset to train deep learning model 900. In an embodiment, simulated data generation section 810 uses the parameters discussed earlier to generate a simulated dataset. In an embodiment, simulated data generation section also may augment the generated simulated dataset in the manners described earlier. In an embodiment, the generated simulated dataset or augmented simulated dataset may be stored in storage 860. In an embodiment, data for the dataset also may include experimental data from image data section 820. This data may be stored beforehand in storage 860, or may be generated by suitable input structure providing images to image data section 820, which can process the images. The processed images can form suitable image data for the dataset. In an embodiment, this image data may be stored in storage 860.

In an embodiment, each of simulated data generation section 810 and image data section 820 may comprise one or more processors, and suitable transitory and non-transitory data storage to enable the one or more processors to carry out their necessary functions. In an embodiment, simulated data generation section 810 and image data section 820 may provide their outputs directly to processing system 840, which in an embodiment may comprise one or more processors, and suitable transitory and non-transitory data storage to enable the one or more processors to carry out their necessary functions. In an embodiment, simulated data generation section 810 and image data section 820 may provide their outputs to processing system 840 via a network or cloud 850.

In an embodiment, processing system 840 may compile a training dataset to be used to train deep learning model 900. As has been discussed earlier, the training dataset may comprise simulated data, and also may comprise experimental data, depending on the embodiment. In an embodiment, processing system 840 may augment the simulated dataset received from simulated data generation section 810. In an embodiment, as discussed previously, processing system 840 may receive data directly from simulated data generation section 810 and image data section 820. In an embodiment, processing system 840 may retrieve simulated data and image data from storage 860, either selecting the data to be retrieved, or processing the data to generate a suitable training dataset to train the deep learning model 900.

Deep learning model 900, which in an embodiment may include one or more central processing units (CPUs) and/or graphics processing units (GPUs) and associated non-transitory storage and/or non-transitory memory, may receive the training dataset directly from processing system 840. In an embodiment, deep learning model 900 may receive the training dataset via a network or cloud 850.

Figure 9:
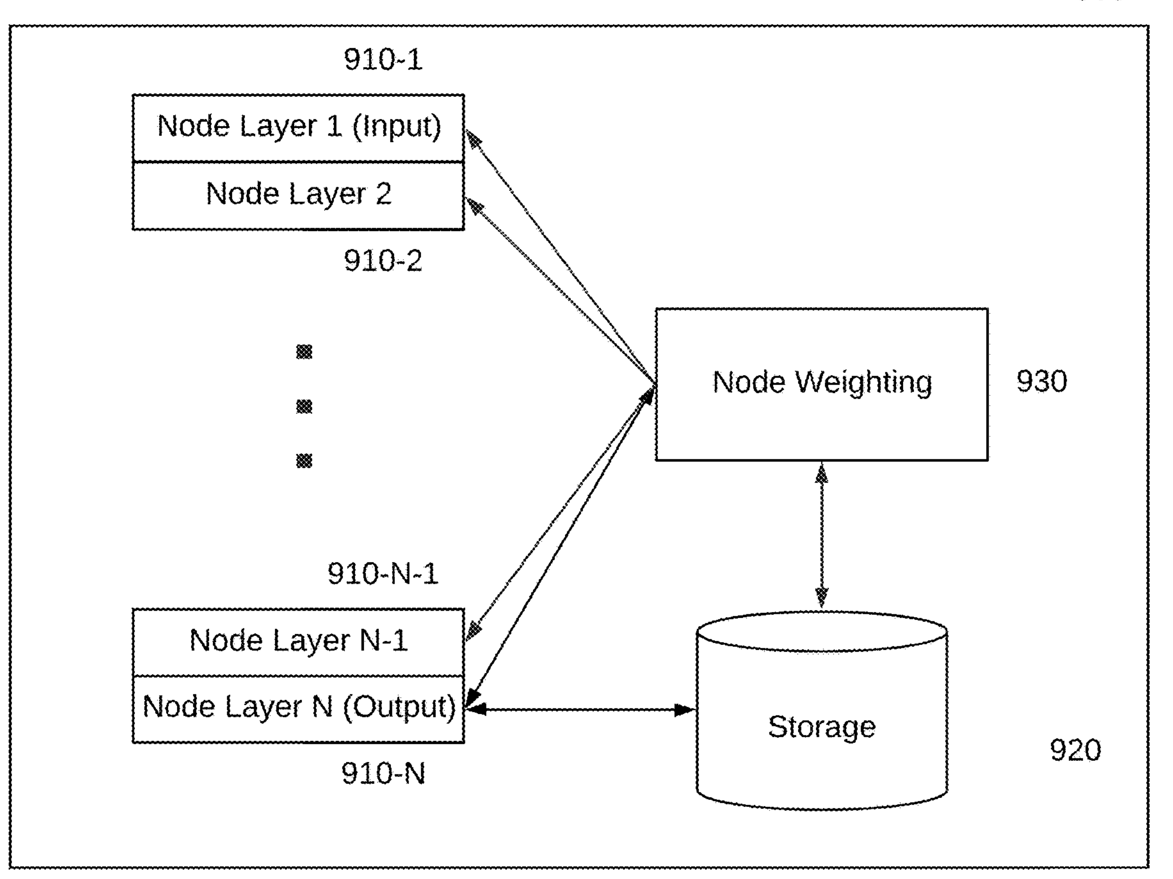
FIG. 9 shows a high-level example of a deep learning system for model training according to an embodiment.

Deep learning model 900 handles changes to the deep learning model. In FIG. 9, storage 920 may store weights and data for the model. In an embodiment, node weighting module 930 may comprise one or more processors, and suitable transitory and non-transitory data storage to enable the one or more processors to carry out their necessary functions. In an embodiment, node weighting module may calculate weights for the various nodes in the various layers of deep learning model 900 based on comparison with results, among other things, and may assign those weights to layers 910-1, 910-2, . . . 910-N-1, and 910-N accordingly. Depending on the deep learning model employed, back-propagation of error corrections to the various layers may be carried out, with node weighting module 930 assisting as needed in performing necessary calculations and outputting resulting weights to the various layers.

As ordinarily skilled artisans will appreciate from the foregoing, a deep learning system such as a CNN may be applied effectively to steady-state ultrasonic wavefield measurements for NDE on plate-like structures. Image segmentation on wavefield images enables visualization and characterization of damage and defects on a pixel-by-pixel basis. Deep learning systems can be applied successfully to steady-state ultrasonic measurements used in ASSESS techniques to perform NDE. A trained deep learning model overcomes the problems ASSESS encounters when estimating wavenumber near edges of a scan area, and can provide sharper, more accurate, and more reliable detection of defect boundaries. Using deep learning models also can greatly decrease processing time compared to ASSESS. Robust training sets, employing simulated generated data for the training sets as appropriate, can enable a deep learning system to account for numerous discrete thickness values, different (lower) signal-to-noise ratios, decreased thickness reduction percentage, decreased defect or damage size, different component sizes, materials, and excitation frequencies. The more training with a wide range of data combinations, the better trained the deep learning system will be.

While the invention has been described in detail above with reference to several embodiments, ordinarily skilled artisans will appreciate that variations within the scope and spirit of the invention are possible. Accordingly, the invention should be construed as limited only by the scope of the following claims.

What is claimed is:

1. A computer-implemented method employing a deep learning model to analyze inspection measurements of structural or mechanical components for defects or damage, the computer-implemented method comprising:

generating a dataset from a plurality of simulated components, each having simulation parameters provided thereto, the simulation parameters including a plurality of parameters selected from the group consisting of component geometry, defect number, defect location, defect shape, and defect depth;

for each simulated component:

running, on a computer, a plurality of ultrasonic wavefield simulations, comprising locating one or more excitation transducers in different positions with respect to defects on the simulated component, each of said plurality of ultrasonic wavefield image simulations resulting in data for the dataset;

the method further comprising:

training the deep learning model using the dataset; and applying the deep learning model to input data comprising ultrasonic wavefield images collected from inspection measurements of actual components to identify whether any of the actual components contains one or more defects or damaged regions.

2. The computer-implemented method according to claim 1, further comprising:

augmenting the dataset by running a further plurality of ultrasonic wavefield simulations with experimental data comprising experimental ultrasonic wavefield images to produce an augmented dataset;

the method further comprising training the deep learning model with the augmented dataset.

3. The computer-implemented method according to claim 2, wherein augmenting the dataset is performed between iterations of training the deep learning model.

4. The computer-implemented method according to claim 2, wherein augmenting the dataset is performed before an iteration of training the deep learning model.

5. The computer-implemented method according to claim 1, further comprising:

augmenting the dataset by performing one or more of the following on the plurality of ultrasonic wavefield image simulations to generate an augmented dataset:

performing one or more geometric transformations; and introducing noise;

the method further comprising training the deep learning model with the augmented dataset.

6. The computer-implemented method according to claim 5, wherein augmenting the dataset is performed between iterations of training the deep learning model.

7. The computer-implemented method according to claim 6, wherein the geometric transformations are selected from the group consisting of windowing, clockwise rotation, counterclockwise rotation, horizontal flipping, vertical flipping, and transverse flipping.

8. The computer-implemented method according to claim 6, wherein the noise comprises Gaussian noise.

9. The computer-implemented method according to claim 5, wherein augmenting the dataset is performed before an iteration of training the deep learning model.

10. The computer-implemented method according to claim 9, wherein the geometric transformations are selected from the group consisting of windowing, clockwise rotation, counterclockwise rotation, horizontal flipping, vertical flipping, and transverse flipping.

11. The computer-implemented method according to claim 9, wherein the noise comprises Gaussian noise.

12. The computer-implemented method according to claim 5, wherein the geometric transformations are selected from the group consisting of windowing, clockwise rotation, counterclockwise rotation, horizontal flipping, vertical flipping, and transverse flipping.

13. The computer-implemented method according to claim 5, wherein the noise comprises Gaussian noise.

14. The computer-implemented method according to claim 1, further comprising:

augmenting the dataset by performing one of a phase shift or a temporal translation on the plurality of ultrasonic wavefield simulations to generate an augmented dataset;

the method further comprising training the deep learning model with the augmented dataset.

15. The computer-implemented method according to claim 14, wherein augmenting the dataset is performed between iterations of training the deep learning model.

16. The computer-implemented method according to claim 14, wherein augmenting the dataset is performed before an iteration of training the deep learning model.

17. The computer-implemented method according to claim 1, wherein the deep learning model comprises a convolutional neural network selected from the group consisting of U-Net convolutional neural networks and fully convolutional neural networks.

18. The computer-implemented method according to claim 1, wherein the simulated components and actual components comprise plates or plate-like structures.

19. The computer-implemented method according to claim 1, wherein a geometry of the simulated components and actual components is selected from the group consisting of planar and arcuate.

20. The computer-implemented method according to claim 1, wherein applying the deep learning model comprises performing semantic segmentation on simulated ultrasonic wavefield images of a steady-state, select-tone excitation of the structural or mechanical components.

21. The computer-implemented method according to claim 1, further comprising:

combining the deep learning model outputs from a plurality of ultrasonic wavefield images generated from a phase shift or a temporal translation of an instance of the ultrasonic wavefield.

* * * * *